Patented Sept. 1, 1931

1,821,565

UNITED STATES PATENT OFFICE

SHOICHIRO NAGAI, OF HONGO-KU, TOKYO, AND KICHIZO KAWAMURA, OF KYOBASHI-KU, TOKYO, JAPAN, ASSIGNORS TO GOSUKE IMAI, OF TOKYO-FU, JAPAN

SPECIAL MIXED CEMENT OF A HIGH GRADE STRENGTH

No Drawing. Application filed February 11, 1929, Serial No. 339,260, and in Japan September 21, 1928.

This invention relates to improvements in the production of a specially mixed cement of high degree of strength, and the characteristic feature of this invention resides in the preliminary preparation of a mixture done by mixing and grinding the following two ingredients, namely, (1) The first class ingredient composed of calcined products of igneous rocks such as granite, liparite, quartz porphyrite, diorite or the like, (2) The second class ingredient containing much of acid components such as soluble silica, soluble alumina and soluble iron oxide of decomposed matters of tuff, basalt, andesite or the like.

To the aforesaid mixture is then added Portland cement clinker and ground together and pulverized into an intimate mixture of fine powder. The principal object of this invention is to produce a specially mixed cement of high grade both for slow and quick hardening and far beyond the strength of ordinary Portland cement. This is accomplished by properly inducing the latent hydraulic properites of each of the ingredients and thus promoting and accelerating the hardening of hydraulic cement.

The hardening of Portland cement prepared of ordinary cement clinker, made of lime-stone and clay, is principally due to the formation of calcium silicate, calcium aluminate and free lime or calcium hydroxide by the hydrolysis decomposition of di-calcium silicate, tri-calcium silicate, tri-calcium aluminate and the like, forming the proper hydraulic compounds of Portland cement. It is also due to the formation of calcium carbonate by combining free lime with carbon dioxide in the air or the formation of calcium silicate by gradually combining free lime with silica on surface of broken stone, gravel, silica sand and the like used for mixing with Portland cement. But the aforesaid formation of calcium carbonate by combining free lime with carbon dioxide is very slow and gradual as the reaction between free lime and carbon dioxide takes place gradually from the outer surface to the interior of the concrete mass because it is very difficult to induce the carbon dioxide to penetrate into the inner parts of the concrete mass. Moreover, as it is also a slow process to combine the free lime with silicic acid on the surface of broken stone, gravel, silica sand and the like in the concrete mass, it can, accordingly, scarcely be expected to obtain a rapid increase in strength, nor to obtain a high grade of strength on account of loss of free lime dissolved into water.

In this invention, however, and in order to prevent this loss of free lime which is urgently needed to obtain increase in strength by hardening of Portland cement and at the same time to further increase the grade of strength by producing rapidly a considerable amount of calcium silicate and calcium aluminate, the inventors propose first to prepare a mixture of the above described two ingredients and grinding them together, which they call the first class and the second class ingredient respectively; and then to add to this mixture Portland cement clinker and thereupon regrind and pulverize the entire mass into an intimate mixture of fine powder. As to said first class ingredient it is proposed to use calcined products of igneous rocks composed of quartz and feldspar, and as to the second class ingredient any natural or artificial products may be utilized which contain a great portion of soluble acid components as soluble silica, soluble alumina, soluble iron oxide and the like. Thus by utilizing those two ingredients the object can be attained to have a rapid hardening and at the same time an increase in strength by properly inducing the latent hydraulic properties of each ingredient.

To explain more particularly the embodiment of this invention, the raw materials for the first class ingredient are such igneous rocks as granite, liparite, quartz porphyrite, diorite or the like and they each contain a considerable amount of silica (quartz) and alkali alumino-silicate (feldspar). To make the calcined products from these raw materials they are heated to about 800° C. for about two hours. After calcination quartz contained in these igneous rocks is changed to the most stable form and at the same time there is produced soluble silica and soluble alumina by the decomposition of feldspar (alkali alumino-silicate).

Thus when these calcined products which had been subjected to aforesaid changes are mixed with Portland cement the promotion of the stability of Portland cement against heat by the presence of calcined quartz has been established. Moreover, there are produced numerous cracks in calcined quartz after calcination and as a consequence the formation of calcium silicate may easily occur by combining with free lime produced by the hydrolysis of Portland cement with soluble silica in the calcined rocks, thus further increasing the strength of hardened concrete.

Furthermore, there occurs another chemical reaction between free lime, soluble silica and soluble alumina produced by the decomposition of alkali alumino-silicate, so that the hardening of hydraulic cement is remarkably accelerated and its strength is greatly increased. These are the effects due to the latent hydraulic property originally possessed by the first class ingredient and induced when it is mixed with Portland cement clinker.

As to the second class ingredient, any natural or artificial substance may be used if it contains an abundance of colloidal solution components such as silica, alumina, iron oxide and the like. As an example, the inventors propose to use weathered materials of tuff, basalt, andesite or the like, in which there is present much of colloidal solution components. There are many natural materials to be used as the second class ingredients. Moreover, as artificial material may be used slag produced from various metallurgical ovens and byproducts from various industries which also contain a great quantity of soluble acid components.

When these materials, forming the second class ingredient, contain much of colloidal solution components mixed with Portland cement clinkers, they may easily be combined with free lime and the said colloidal solution components by inducing the latent hydraulic property of this ingredient, and at the same time it is easy to accelerate the hardening and give rise to an early high grade strength by producing calcium silicate, calcium aluminate and the like which are useful for giving increased strength to the hydraulic cement.

When the first and second class ingredients are mixed and ground and then to said mixture is added Portland cement clinker, the object is easily attained of inducing proper hydraulic action between the Portland cement clinker and the first and second class ingredients.

As above stated alkali in the first class ingredient contacts with silica, alumina and iron oxide in the second class ingredient and these soon combine with each other and then produce alkali silicate, alkali aluminate and the like which are urgently needed to promote the desired hydraulic action of cement and at the same time these combined products cover the surface of broken stone, gravel, silica sand and the like which are present in mixing with cement and thus is caused the increase of strength of the cement.

In view of the fact, as mentioned above, that the two aforesaid ingredients are remixed with Portland cement clinker and then the entire mass is pulverized into an intimate mixture of fine powder, the specific latent hydraulic properties of the said two ingredients are remarkably induced by free alkalies produced in hydrolysis of Portland cement, and at the same time there may be produced a sort of hydraulic action between the substances in the said two ingredients by the contact of said substances present in the two ingredients.

Now resuming the subject-matter of this specification we may note as follows:

(1) The substance used as the first class ingredient is important for promoting the stability of mixed cement against heat chiefly by the calcined quartz present in it and for giving rise to a continuous increase of strength in a long time.

(2) The substance used as the second class ingredient is also important for accelerating the hardening of cement chiefly by the colloidal solution components present in the said ingredient and thus getting an early high grade strength, and, (3) Owing to the coexistence of the substances respectively of the first and second class ingredients it is possible to make the mixed cement capable of greater waterproof quality, water-resistibility and more rapid hardening through the chemical combination of soluble alkalies in the first class ingredient and soluble acid components in the second class ingredient.

The product of this invention, namely, a special mixed cement, produced by mixing the calcined igneous rocks containing quartz and feldspar and the soluble acid components, which are ground together and then remixed with a proper quantity of Portland cement clinker, the entire mass being again ground and pulverized into an intimate mixture of fine powder, thereby effectively inducing the respective latent hydraulic properties of the said calcined igneous rocks and the colloidal solution components; said product is of extremely high degree of strength.

As an example of the execution of this invention it is described as follows: first, a mixture is prepared of substances belonging to the first and second class ingredients in the range of ratio of 5 to 3 and 3 to 5 respectively, and they are ground at a temperature of 150° to 200° C., then to the ground mixture is added Portland cement clinker at about 30 to 40 percent of clinker. Then the entire mass is reground and pulverized into an intimate mixture of fine powder.

Having now particularly described and ascertained the nature of the said invention and in what manner the same is to be performed, we declare that what we claim is:—

1. A method of manufacturing mixed cement of high degree of strength and of highest hydraulic properties, consisting in mixing and grinding a primary and a secondary ingredient, said primary ingredient comprising material selected from a group consisting of calcined igneous rocks containing granite, liparite, quartz porphyrite and diorite; said secondary ingredient comprising a substance containing colloidal solution components in considerable quantity and selected from a group consisting of silica, alumina and iron oxide, weathered matters of tuff, basalt and andesite, and then adding to said mixture Portland cement clinker, grinding and pulverizing the resultant mass into an intimate mixture of fine powder.

2. A method of manufacturing mixed cement of high degree of strength and of highest hydraulic properties, consisting in mixing and grinding a primary and a secondary ingredient, said primary ingredient comprising material selected from a group consisting of calcined igneous rocks containing granite, liparite, quartz porphyrite and diorite; said secondary ingredient comprising a substance containing colloidal solution components in considerable quantity and selected from a group consisting of silica, alumina and iron oxide, weathered matters of tuff, basalt and andesite, then adding to said mixture Portland cement clinker, grinding and pulverizing the resultant mass into an intimate mixture of fine powder; the quantity of said primary ingredient being 42 to 22 percent and the secondary ingredient in the mixture being 22 to 42 percent of the final product respectively, and the grinding taking place at a temperature ranging from 150° to 200° C.

3. A method of manufacturing mixed cement of high degree of strength and of highest hydraulic properties, consisting in mixing and grinding a primary and a secondary ingredient, said primary ingredient comprising material selected from a group consisting of calcined igneous rocks containing granite, liparite, quartz porphyrite and diorite; said secondary ingredient comprising a substance containing colloidal solution components in considerable quantity and selected from a group consisting of silica, alumina and iron oxide, weathered matters of tuff, basalt and andesite, then adding to said mixture Portland cement clinker, grinding and pulverizing the resultant mass into an intimate mixture of fine powder; the quantity of said primary ingredient being 42 to 22 percent and the secondary ingredient in the mixture being 22 to 42 percent of the final product respectively, the grinding taking place at a temperature ranging from 150° to 200° C.; and the Portland cement clinker being added in the proportion of 30 to 40 percent of the total mixture.

4. A composition of cement having high degree of strength and highest hydraulic properties comprising a finely ground mixture of 42 to 22 percent of a primary ingredient, 22 to 42 percent of a secondary ingredient and 30 to 40 percent of Portland cement clinker of the final product, said primary ingredient comprising material selected from a group consisting of calcined igneous rocks containing granite, liparite, quartz porphyrite and diorite; said secondary ingredient comprising a substance containing colloidal solution components in considerable quantity and selected from a group consisting of silica, alumina and iron oxide, weathered matters of tuff, basalt and andesite.

In witness whereof we have hereunto set our hands.

SHOICHIRO NAGAI.
KICHIZO KAWAMURA.